UNITED STATES PATENT OFFICE.

ARTHUR E. ALLEN, OF KIRKLAND, WASHINGTON.

PROCESS OF DEHYDRATING POTATOES.

1,377,172.   Specification of Letters Patent.   Patented May 10, 1921.

No Drawing.   Application filed December 31, 1919. Serial No. 348,653.

*To all whom it may concern:*

Be it known that I, ARTHUR E. ALLEN, a citizen of the United States, residing at Kirkland, in the county of King and State of Washington, have invented certain new and useful Improvements in Processes of Dehydrating Potatoes, of which the following is a specification.

The present invention relates to a process of dehydrating potatoes, and more especially sweet potatoes, yams and the like, the object being to produce an article that will keep indefinitely, will retain its flavor and nutritious properties, and can be quickly prepared with ease for consumption.

The following is the preferred embodiment of the invention. The potatoes are first graded and are washed carefully. They are then peeled, preferably by machines, and afterward gone over and trimmed by hand. They are then treated, preferably by live steam until they are thoroughly cooked, this cooking process requiring approximately fifteen minutes, though the time will vary somewhat dependent on the size of the potatoes, as will be obvious.

The cooked potatoes are then run through a ricer, producing elongated strands or filaments that are placed in thin layers on drying trays. These trays are placed in a drying machine and the filaments dehydrated by being subjected to a drying temperature, preferably beginning at 130° F. The period required for dehydrating varies from three to five hours, depending on the conditions and the size or diameter of the strands or filaments. During the drying period the temperature is gradually increased until at the close thereof, it approximates 150° F., but in any event is preferably maintained below the cooking temperature, namely, 156° F.

Shortly before the expiration of the drying period and when the strands are sufficiently brittle to break easily, they are broken into short pieces or sections, after which the drying is completed. Upon such completion the temperature is raised to about 180° F. for a short period—approximately ten minutes. This causes a hard sealing coat or surface to form upon the sections without altering the characteristics of the sugar and starch contents.

The product is then quickly cooled by passing it through cold air currents, and is then ready for packing. This quick cooling produces a better product than when it is allowed to cool naturally to the temperature of the atmosphere, in that the particles do not then stick together. The final product, if desired, can be readily ground into flour, and if packed in air-tight containers, will maintain its original condition.

I claim:—

1. The process of dehydrating potatoes, which consists in cooking the same, forming elongated filaments of the cooked potatoes, subjecting the filaments to a drying action and breaking the filaments into short pieces after the same have become set and prior to the completion of the drying action.

2. The process of dehydrating potatoes, which consists in cooking the same, forming filaments of the cooked potatoes, subjecting the filaments to a drying temperature for a period and then increasing the temperature to produce a hardened surface on the filaments.

3. The process of dehydrating potatoes, which consists in cooking the same, forming filaments of the cooked potatoes, subjecting the filaments to a drying temperature below a cooking temperature until the filaments become brittle and then subjecting the filaments to a temperature above the cooking temperature.

4. The process of dehydrating potatoes, which consists in cooking the same until soft, forming the cooked potatoes into elongated filaments, subjecting the filaments to a drying action at a temperature below 156° F., breaking the filaments into short sections, and subjecting the short dried sections to a temperature above 156° F. for a brief period.

5. The process of dehydrating potatoes, which consists in cooking the same, forming filaments of the cooked potatoes, subjecting the filaments to a drying temperature for a period, then increasing the temperature to produce a hardened surface on the filaments, and quickly lowering the temperature.

In testimony whereof, I affix my signature.

ARTHUR E. ALLEN.